United States Patent [19]

Boomer

[11] 4,017,092
[45] Apr. 12, 1977

[54] TRASH BAG CADDY

[76] Inventor: Virginia M. Boomer, 50575 Fairchild Road, Mount Clemens, Mich. 48043

[22] Filed: Oct. 20, 1975

[21] Appl. No.: 623,981

[52] U.S. Cl. .............................. 280/47.26; 248/98
[51] Int. Cl.[2] ......................................... B62B 1/12
[58] Field of Search ................. 280/47.26, 47.19; 248/98, 97, 99; 150/48, 49, 50, 51

[56] References Cited

UNITED STATES PATENTS

| | | | |
|---|---|---|---|
| 2,531,520 | 11/1950 | Lankford | 280/47.26 X |
| 2,847,227 | 8/1958 | Lankford | 248/98 |
| 2,851,186 | 9/1958 | Rupe | 280/47.26 X |
| 3,341,219 | 9/1967 | Marini et al. | 280/47.19 |
| 3,799,228 | 3/1974 | Crawford | 150/49 |

FOREIGN PATENTS OR APPLICATIONS

| | | | |
|---|---|---|---|
| 829,322 | 3/1960 | United Kingdom | 280/47.26 |

Primary Examiner—Robert R. Song
Assistant Examiner—John A. Pekar
Attorney, Agent, or Firm—Basile, Weintraub and Vanophem

[57] ABSTRACT

A trash bag caddy of the type to store and transport loaded plastic trash bags. The trash bag caddy comprises a wheeled, rigid frame having two parallel tubular legs forming a horizontal lower member which, in turn, supports two vertical members at opposite ends. One of the vertical members has a handlebar means thereon. An upper rectangular member positioned in a vertically-spaced relation above the lower member comprises two releasably joined U-shaped portions which attach to the vertical support to complete the rigid frame. A multi-apertured bag made from materials sufficiently strong to withstand the attack of canine creatures and other small animals is carried by the upper rectangular member. The multi-apertured bag is sufficiently pliant to permit the deposit of a variable number of the aforementioned trash bags.

2 Claims, 4 Drawing Figures

U.S. Patent   April 12, 1977   4,017,092
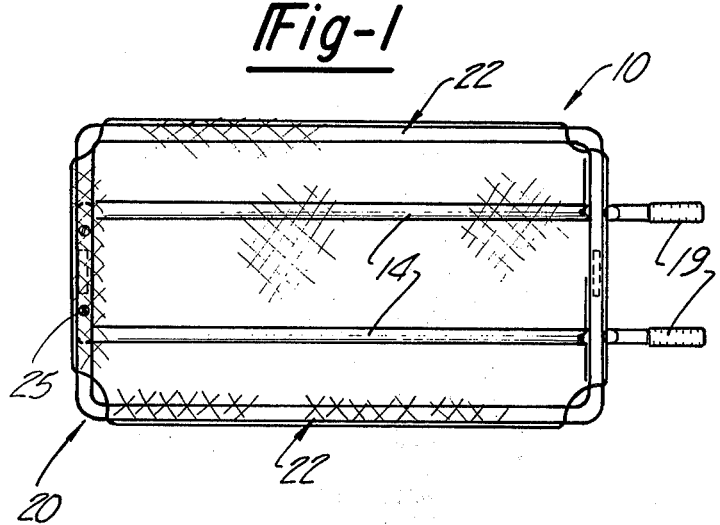
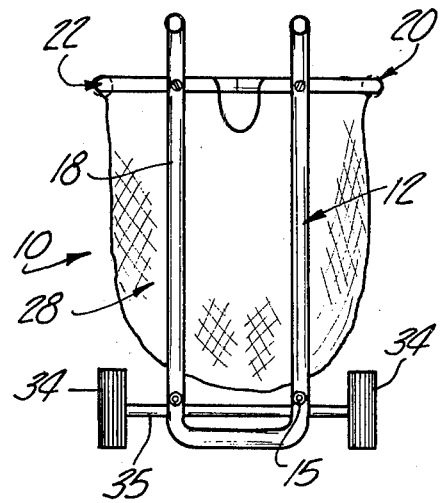
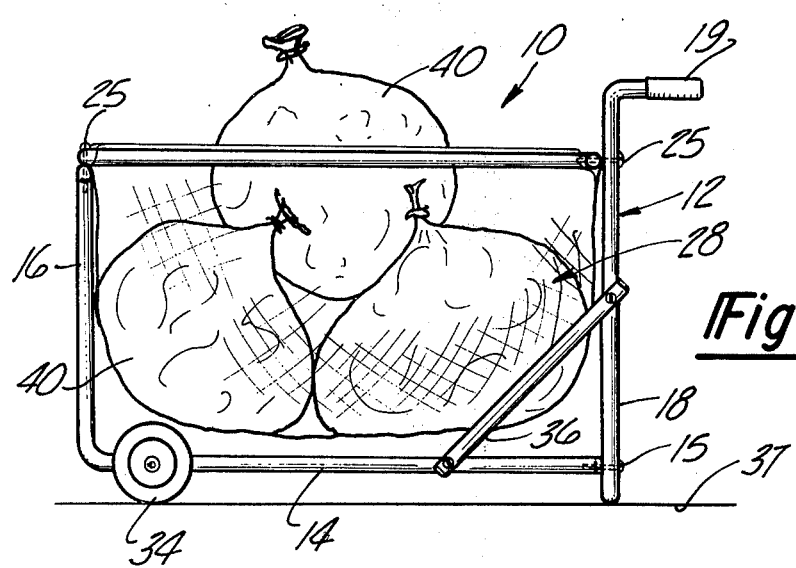
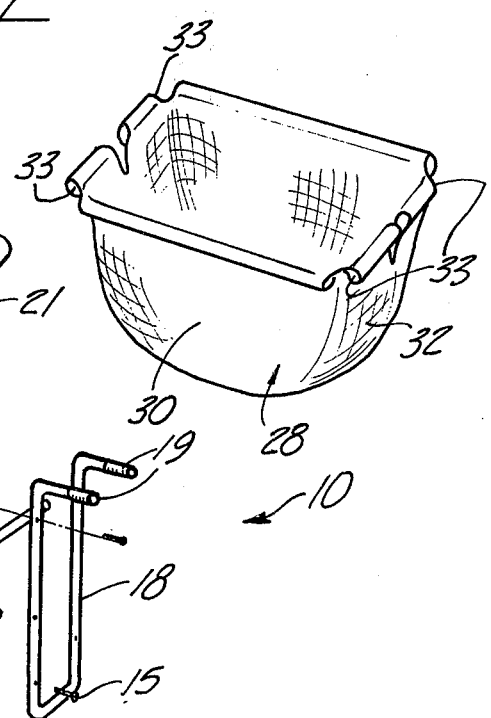
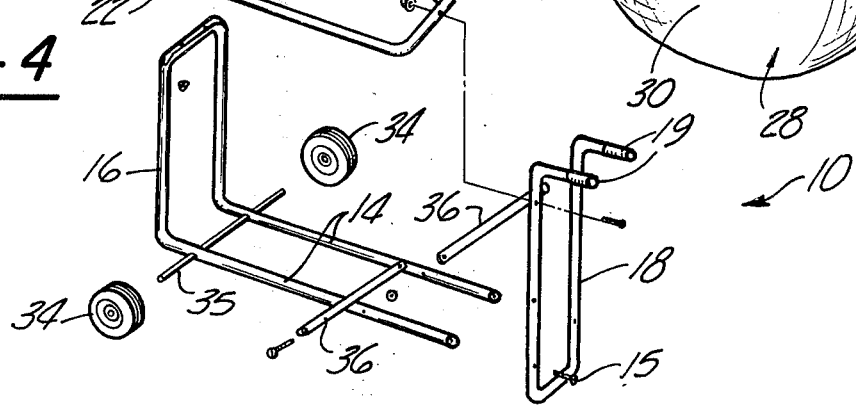

TRASH BAG CADDY

BACKGROUND OF THE INVENTION

I. Field of the Invention

The present invention relates to a new and novel means for the storage and transport of loaded plastic trash bags.

II. Description of the Prior Art

Heretofore, numerous devices and apparatuses have been employed for the storage and transportation of trash cans and similar metal trash holders. Examples of such prior art devices are disclosed in U.S. Pat. Nos. 3,292,795; 3,806,146; and 3,888,442. To the knowledge of the inventor, no device is disclosed in the prior art which has the features of applicant's invention as disclosed and claimed herein.

SUMMARY OF THE INVENTION

The present invention, which will be described subsequently in greater detail, comprises a trash bag caddy of the type to store and transport loaded plastic trash bags comprising a rigid frame having means for mounting a multi-apertured bag made of materials sufficiently strong to withstand the attack of canine creatures and other small animals, yet sufficiently pliant to permit the deposit of variable numbers of trash bags.

It is therefore an object of the present invention to provide a new and improved trash bag caddy which lends itself to the simple storage of one or more plastic trash bags thereon, and which may be dismounted with ease and facility.

It is another object of the present invention to provide a trash bag caddy which is relatively inexpensive to manufacture, convenient to use, and which will remain clean and which may be easily cleaned after use.

Other objects, advantages, and applications of the present invention will become apparent to those skilled in the art of such trash bags when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein:

FIG. 1 is a top plan view of the trash bag caddy;

FIG. 2 is a rear elevational view of the trash bag caddy showing a multi-apertured bag in position;

FIG. 3 is a side elevational view of the trash bag caddy; and

FIG. 4 is an exploded perspective view of the trash bag caddy showing the separate components of a tubular frame and the multi-apertured bag.

DESCRIPTION OF THE PREFERRED EMBODIMENT

Referring to the drawing and, in particular, to FIGS. 3 and 4, the numeral 10 designates generally a trash bag caddy constructed in accordance with the principles of the present invention; the caddy 10 comprising a rigid tubular frame 12. As seen in FIG. 4, a lower horizontal member 14 of the frame 12 integrally carries a vertical support 16 at one end, while a second vertical support 18 at the opposite end of the member 14 is attached thereto by any suitable screw means 15. The second vertical support 18 also carries handle grip means 19 on the tip of each of its legs to permit propelling the caddy 10 on wheels 34, as will be described hereinafter. Completing the component parts of the frame 12 is a top rectangular member 20 which is formed by two releasably joined U-shaped portions 22 defining two parallel longitudinal sides 24 (FIG. 4) and two parallel transverse sides 26. The union of the two U-shaped portions 22 generally forms the top rectangular member 20. The U-shaped portions 22 are joined by means of coupling shafts 21 carried at the ends of one portion 22 and designed to be received within the interior of the other tubular U-shaped portion 22. Ordinary screw means (not shown) extending through the U-shaped portion 22 and the shaft 21 fixedly engage the two. The so-assembled top rectangular member 20 is attached to the vertical supports 16 and 18 by any suitable fastening means, such as fastening screws 25.

Referring still to FIG. 4 wherein there is illustrated a multi-apertured bag 28 of a fishnet-type mesh. The bag 28 is of a generally rectangular shape having two parallel longitudinal surfaces 30 and two parallel transverse surfaces 32. Each of the four surfaces 30 and 32 of the mesh bag 28 form loops resulting in an annular tube 33 around the upper perimeter of the bag 28, the purpose of which will be described hereinafter.

As best seen in FIG. 3, the pair of wheels 34 is connected to the lower horizontal member 14 by means of a rod 35 carried at a point proximate to vertical support 16 to facilitate the transporting of the caddy 10. The length of vertical support 18 is greater than vertical support 16; therefore, when the caddy 10 is resting on the wheels 34 and vertical support 18, it remains at rest and horizontal to the ground 37. When, by means of the handle grips 19, the vertical support 18 is inclined upwardly, the wheels 34 permit movement of the caddy 10.

Further support is lent to the tubular frame 12 by means of a pair of braces 36 which are attached in the usual manner to the lower horizontal member 14 and the vertical support 18.

In use the caddy 10 is assembled with the vertical supports 16 and 18 attached to the horizontal lower frame 14. The two U-shaped portions 22 of the top rectangular member 20 are inserted into the annular tube 33 of the multi-apertured bag 28 with the longitudinal surfaces 30 of the bag 28 being positioned contiguously to the longitudinal sides 24 of the top rectangular member 20, while the transverse surfaces 32 of the bag 28 are contiguous to the transverse sides 26 of the top rectangular frame 20.

The caddy 10 is then prepared to receive a quantity of plastic trash bags 40; the number being variably dependent on the size of the bags and the flexibility of the material forming the apertured bag 28. It is in the spirit and intention of this invention that the material used for the bag 28 be sufficiently stout to withstand attacks by dogs and other small animals attempting to reach the garbage inside the bags, yet sufficiently pliable to permit the distortion that would necessarily accompany a deposit of irregularly-shaped trash bags. While the trash bags are accumulating in the caddy 10, it is at rest in the position shown in FIG. 3. Once its capacity of trash bags is reached, the caddy 10 may be wheeled to a convenient unloading spot, such as a trash pickup, by simply engaging the handle grips 19 and tilting the caddy 10 upwardly at an angle so that the lower end of vertical support 18 is lifted off the ground.

Although only one example of the present invention has been disclosed, it should be understood by those skilled in the art of trash bags that other forms of the present invention may be had without departing from the spirit of the invention or the scope of the appended claims.

What is claimed is as follows:

1. A trash bag caddy of the type to store and transport loaded plastic trash bags comprising:

a rigid frame having two parallel tubular legs forming a horizontal lower member carrying two vertical supports at opposite ends, one of said vertical supports having handlebar means, the other vertical support terminating in a horizontal support surface; an upper rectangular member positioned in a vertically spaced relation above said lower member and comprising two releasably joined U-shaped portions which attach to said vertical supports to complete said rigid frame, one joined end of said upper rectangular member being supported by said horizontal surface;

first fastening means extending through said one joined end into said horizontal support surface for simultaneously securing said U-shaped portions to each other and to said horizontal surface;

second fastening means extending through said other joined end into said one vertical support for simultaneously securing said U-shaped portions at said other joined end to each other and to said one vertical support; and a multi-apertured bag made from a material sufficiently strong to withstand the attacks of canine creatures and small animals, yet sufficiently pliant to permit the deposit of a variable number of trash bags, said multi-apertured bag being of a generally rectangular shape and having two opposing longitudinal surfaces and two opposing transverse surfaces, said surfaces forming loops, said loops engaging said U-shaped portions of said upper rectangular member.

2. The trash bag caddy as defined in claim 1 further comprising a shaft carried by said frame and wheel means carried by said shaft.

* * * * *